United States Patent
Klein et al.

(10) Patent No.: US 11,494,510 B2
(45) Date of Patent: Nov. 8, 2022

(54) MULTI-TOUCH ATTRIBUTION AND CONTROL GROUP CREATION USING PRIVATE COMMUTATIVE ENCRYPTED MATCH SERVICE

(71) Applicant: InMarket Media, LLC, Culver City, CA (US)

(72) Inventors: John Raymond Klein, Benicia, CA (US); Mark Christopher Dixon, Belmont, CA (US); Clark Alan Burdick, Sunnyvale, CA (US); Art Haedike, New Port Richey, FL (US); Partha Chowdhury, Los Altos, CA (US)

(73) Assignee: INMARKET MEDIA, LLC, Culver City, CA (US)

( * ) Notice: Subject to any disclaimer, the term of this patent is extended or adjusted under 35 U.S.C. 154(b) by 55 days.

(21) Appl. No.: 17/192,150

(22) Filed: Mar. 4, 2021

(65) Prior Publication Data
US 2022/0284114 A1 Sep. 8, 2022

(51) Int. Cl.
*G06F 21/62* (2013.01)
*H04L 9/00* (2022.01)
(Continued)

(52) U.S. Cl.
CPC .......... *G06F 21/6218* (2013.01); *H04L 9/008* (2013.01); *H04L 63/0421* (2013.01); *H04L 2209/08* (2013.01)

(58) Field of Classification Search
CPC ..... G06F 21/6218; G06F 21/62; H04L 9/008; H04L 63/0421; H04L 2209/08; H04L 9/00; H04L 29/06
See application file for complete search history.

(56) References Cited

U.S. PATENT DOCUMENTS

| 8,275,850 B2 | 9/2012 | Kohan et al. |
| 9,641,318 B2 | 5/2017 | Patel et al. |

(Continued)

OTHER PUBLICATIONS

Walker, A. et al., "Helping organizations do more without collecting more data" Google Security Blog, https://security.googleblog.com/2019/06/helping-organizations-do-more-without-collectin . . . , 8 pages, Jun. 19, 2019.

(Continued)

*Primary Examiner* — Quazi Farooqui
(74) *Attorney, Agent, or Firm* — Thompson Hine LLP

(57) ABSTRACT

Some implementations disclosed herein enable matching identifiers across multiple sources. This may involve adding a unique attribute (e.g., anonymous unique homomorphic identifiers) and/or using randomization to enable comparing data from multiple sources, while also maintaining data privacy. In one example, matches across multiple sources are identified, for example, identifying that there are 100 user identifiers that are in private data sets of three different sources. Such matching may be used to enable private, multi-touch attribution. In another example, techniques are used to determine that data maintained by one source is not also within other sources (e.g., identifying that there are 200 user identifiers that are in data from a first source but not in data from a second source and not in data from a third source. Such determinations may be used to generate control group data that does not match data from other sources.

24 Claims, 7 Drawing Sheets

(51) Int. Cl.
    *H04L 29/06*     (2006.01)
    *H04L 9/40*      (2022.01)

(56)         References Cited

U.S. PATENT DOCUMENTS

| | | | |
|---|---|---|---|
| 9,641,332 | B1 | 5/2017 | Yung et al. |
| 2005/0256740 | A1 | 11/2005 | Kohan et al. |
| 2016/0078431 | A1 | 3/2016 | Ramachandran et al. |
| 2016/0366180 | A1* | 12/2016 | Smith .................... H04L 9/088 |
| 2017/0026345 | A1 | 1/2017 | Salek et al. |
| 2019/0213356 | A1* | 7/2019 | Vagujhelyi .......... H04L 63/0421 |

OTHER PUBLICATIONS

U.S. Patent and Trademark Office (ISA/US), International Search Report and Written Opinion of the International Searching Authority, International Application No. PCT/US2022/016948, 17 pages, dated Jun. 16, 2022.

* cited by examiner

MULTI-TOUCH ATTRIBUTION AND CONTROL GROUP CREATION USING PRIVATE COMMUTATIVE ENCRYPTED MATCH SERVICE

FIELD OF THE INVENTION

This disclosure relates generally to devices and systems that compare, match, and/or utilize data from multiple sources while maintaining data privacy.

BACKGROUND

Existing private encrypted match service (EMS) systems and techniques match data from one source with data from another source by matching encrypted identifiers. Encryption is used to enable each party to maintain the privacy of its respective data. For example, encryption and matching techniques may be configured such that a first source shares its encrypted data with a second source, and the second source is be able to determine that there are items in the first source's encrypted data that match its own data, without having access to the first source's unencrypted data. For example, the first source may share a list of 1000 encrypted user identifiers and the second source may be able to determine that there are 200 matches with its own user identifiers without being able to identify which specific user identifiers match. Existing private EMS systems and techniques, however, have limitations. For example, such systems may not support determining that data matches across multiple sources (e.g., identifying that there are 100 user identifiers that are in private data sets of three different sources). As another example, such systems may not support determining that data maintained by one source is not within other sources (e.g., identifying that there are 200 user identifiers that are in data from a first source but not in data from a second source or a third source).

SUMMARY

Some implementations disclosed herein enable comparing and matching identifiers across multiple sources. This may involve adding a unique attribute (e.g., anonymous, unique homomorphic identifiers) and/or using randomization to enable comparing data from multiple sources in ways that have previously not been possible. As long as the protocol is followed and the identifiers (e.g., homomorphic identifiers) are applied after the data are encrypted and randomized, data privacy is maintained. Such comparisons may identify matches across multiple sources, for example, identifying that there are 100 user identifiers that are in private data sets of three different sources. Such matching may be used to enable multi-touch attribution (MTA) and other services. In another example, comparisons are performed to determine that data maintained by one source is not also within other sources (e.g., identifying that there are 200 user identifiers that are in data from a first source but not in data from a second source and that are not in data from a third source). Such determinations may be used to generate control group data that does not match data from other sources.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE FIGURES

These and other features, implementations, and advantages of the present disclosure are better understood when the following Detailed Description is read with reference to the accompanying drawings.

DETAILED DESCRIPTION

Figure 1:
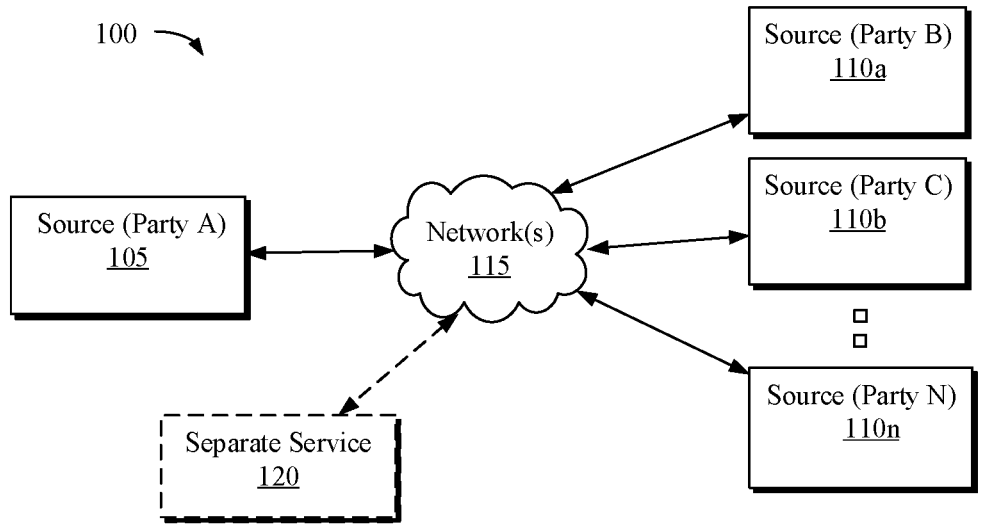
FIG. 1 illustrates an exemplary computing environment according to some implementations disclosed herein.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary computing environment 100 in which multiple sources each maintain private datasets. In this example, data from a first source 105 that is controlled by a legal entity (i.e., Party A) is compared with data from one or more other sources 110a-n, which are each in controlled by a respective legal entity (i.e., Party B, Party C, Party D, . . . , Party N). In other implementations, there is not a one-to-one correspondence between sources and business entities, e.g., a business entity may control data sets of multiple sources. The sources 105, 110a-n communicate with one another via network 115, for example, by sending messages with encrypted data to one another. In some implementations, data that is exchanged by multiple sources is compared by one of the sources. For example, data exchanged between source 105 and source 110a may be compared by source 105. In another example, a separate device (and/or business entity) performs the comparison of data from multiple sources. For example, data exchanged between source 105 and source 110a may be compared by separate service 120.

Figure 2:
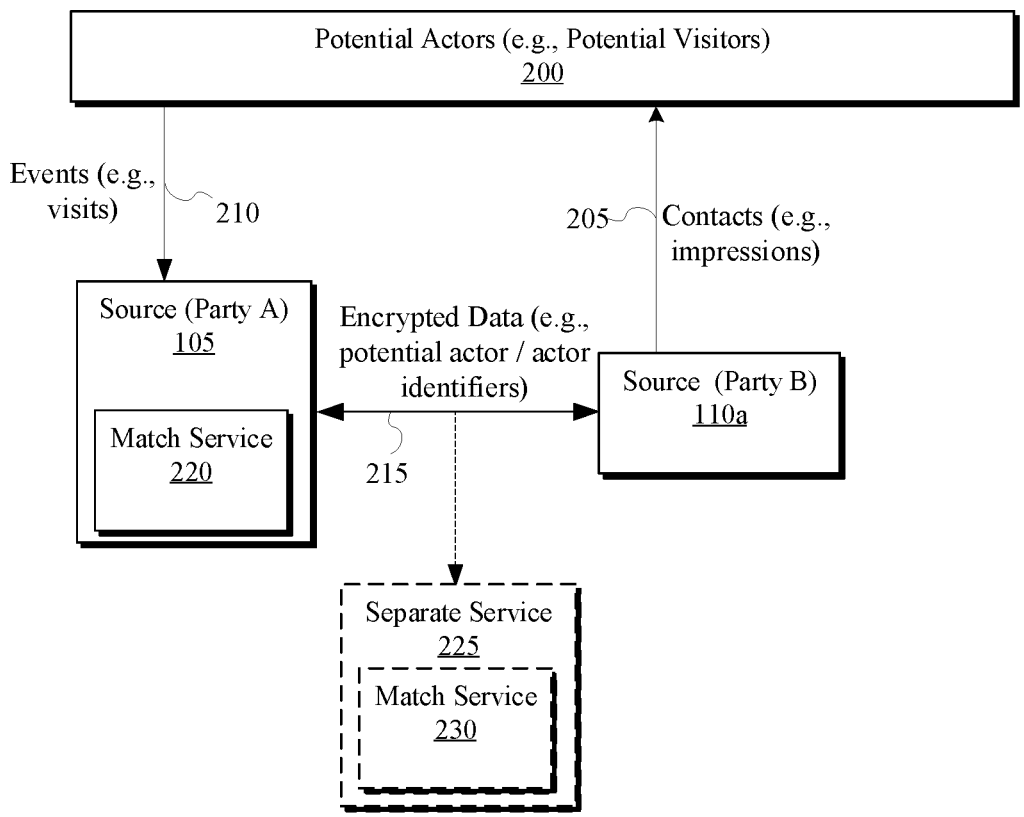
FIG. 2 illustrates example communications and determinations of a match service involving two sources according to some implementations disclosed herein.

FIG. 2 illustrates example communications and determination of a match service involving two sources. In FIG. 2, source 110a provides contacts 205 with potential actors 200. For example, source 110a may provide advertisements (e.g., impressions) to 100 e-mail addresses and privately track those e-mail addresses as unique identifiers of a subset of the potential actors 200 to which it has provided contacts 205. The potential actors may include the universe of people or devices that could be contacted (e.g., exposed to advertising) or could be associated with an event (e.g., visit a store)—some of the universe may be contacted while others of the universe may not be contacted. In another example, source 110a may provide advertisements to its website visitors and privately track identifiers associated with each of those visitors to whom the advertisement were provided as unique identifiers of a subset of potential actors 200 to which it has provided contacts 205.

In FIG. 2, source 105 compiles private data about events 210, e.g., actions taken or participated in by a subset of the potential actors 200, e.g., maintaining a list of the e-mail addresses (or other unique identifier) of a subset of the potential actors 200 that visited a store (e.g., physical or online) to purchase a product from source 105.

Encrypted data (e.g., potential actor/actor identifiers) 215 is exchanged between source 105 and source 110a and match service 220 compares the exchanged data to identify matches. For example, this may involve determining how many identifiers of a subset of identifiers associated with contacts 205 maintained by source 110a match with identifiers of a subset of identifiers associated with events 210 maintained by source 105. In one example, this enables determining how many of the contacts (e.g., impressions) performed by source 110a match (e.g., influenced) the events 210 (e.g., visits) tracked by source 105. The match service 220 may determine that (a) source 110a provided contact 205 (e.g., an advertisement) to 10,000 potential actors of the potential actors 200 and that (b) 1,420 of those 10,000 potential actors were part of an event (e.g., visited a store, made a purchase, etc.) tracked by source 105. Such information may be used to, among other things, assess the effectiveness of the contacts 205 and/or to determine whether and/or how to compensate source 110a for making the contacts 205.

In another example, a separate device (and/or business entity) performs the comparison of data from multiple sources. For example, data exchanged between source 105 and source 110a may be compared by separate service 120 to identify matches and provide feedback information to one or both of the sources 105, 110a.

Figure 3:
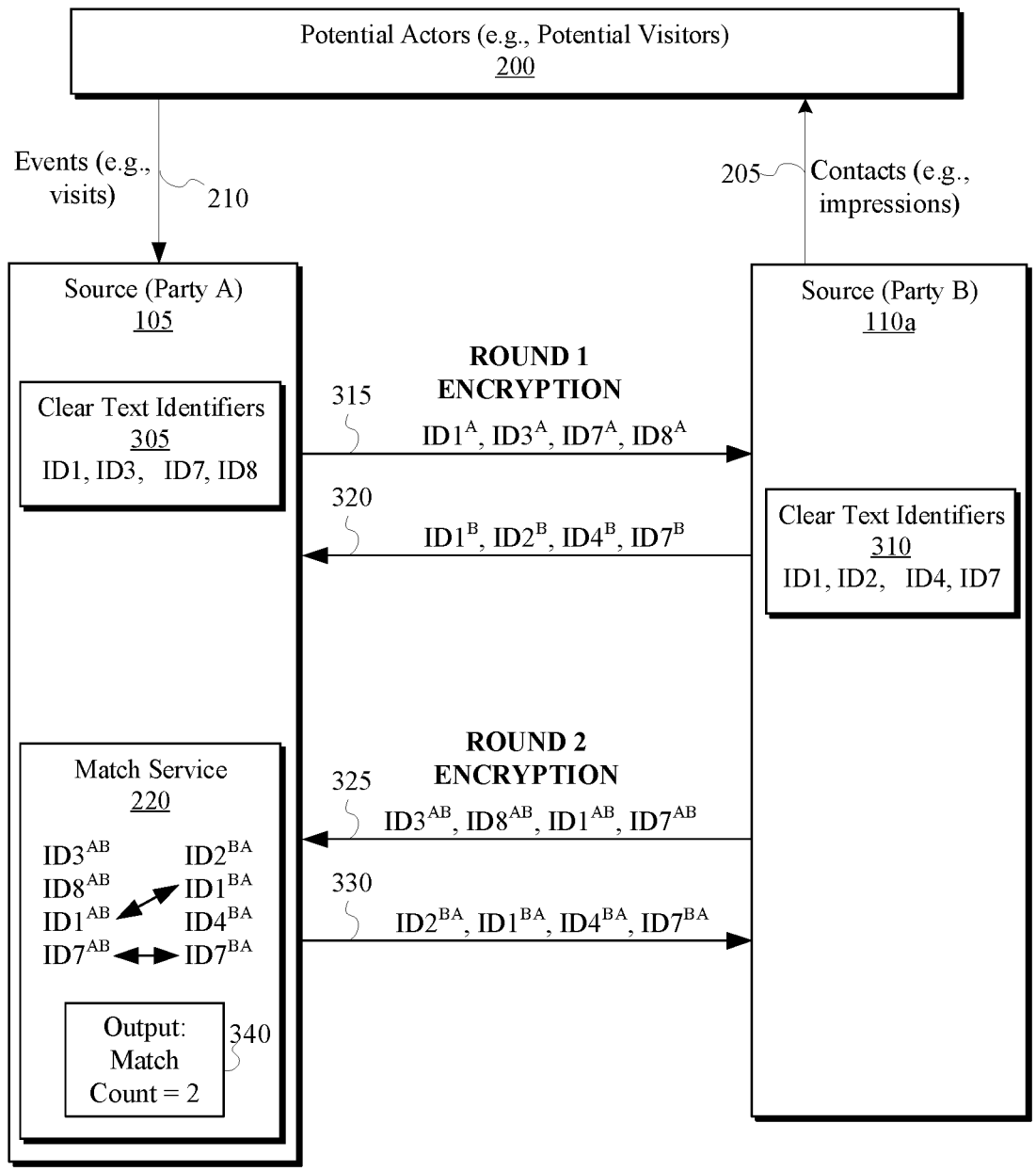
FIG. 3 illustrates example communications and determinations of a match service involving two sources according to some implementations disclosed herein.

FIG. 3 illustrates more-detailed examples of communications and determinations of a match service involving two sources. In this example, the match service uses Elliptical Curve Cryptography (ECC). Elliptical Curve Cryptography is commutative, allowing multiple parties that follow the protocol to exchange and match data in a privacy centric manner, maintaining the privacy of the original clear-text match key data being matched. In this example, only encrypted and shuffled data is ever exchanged between the two parties. In this example, neither party learns what specific match-keys were found in the intersection between the two parties. In this example, in addition to ECC matching on the match-keys, the parties can exchange additional attributes on the privately matched data using homomorphic encryption.

The following notation is used. IDn refers to the clear-text n, e.g., ID3 refers to clear-text of data item 3—identifier 3. $IDn^A$ refers to IDn encrypted with private key A. $IDn^{AB}$ refers to IDn encrypted with private key A, re-encrypted with private key B. $IDn^{AB}, p_m$ refers to IDn encrypted with private key A, assigned homomorphic anonymous identifier $p_m$, and re-encrypted with private key B. Note that the homomorphic anonymous identifier $p_m$ can be, but need not be, a part of the encrypted identifier.

In FIG. 3, source 110a provides contacts 205 with potential actors 200. For example, source 110a may provide advertisements (e.g., impressions) to 100 e-mail addresses of some of those potential actors 200 and privately track those e-mail addresses as unique identifiers of a subset of potential actors 200 to which it has provided contacts 205. In this example, source 110a stores privately maintained clear-text identifiers 310 (ID1, ID2, ID4, ID7) identifying the subset of the potential actors to which it has provided contacts 205, e.g., advertisement impressions.

In FIG. 3, the source 105 compiles private data about events 210, e.g., actions taken, by a subset of the potential actors 200, e.g., maintaining a list of the e-mail addresses (or other unique identifier) of a subset of the potential actors 200 that visited a store (e.g., physical or online) to purchase a product from source 105. In this example, source 105 stores clear-text identifiers 305 (ID1, ID3, ID7, ID8) corresponding to the subset of the potential actors 200 who were part of events 210, e.g., visits or other desired actions.

Source 105 encrypts the clear text identifiers 305 (ID1, ID3, ID7, ID8) that it maintains using private encryption key A to produce encrypted identifiers 315 ($ID1^A$, $ID3^A$, $ID7^A$, $ID8^A$), which it shuffles and sends to source 110a. This may be referred to as "Round 1 encryption." Source 110a similarly performs Round 1 encryption by encrypting and shuffling the clear text identifiers 310 (ID1, ID2, ID4, ID7) that it maintains using private encryption key B to produce encrypted identifiers 320 ($ID1^B$, $ID2^B$, $ID4^B$, $ID7^B$), which it sends to source 105.

Source 110a re-encrypts source 105's Round 1 data ($ID1^A$, $ID3^A$, $ID7^A$, $ID8^A$), randomizes (e.g., shuffles) the resulting rows, and shares the resulting encrypted data 325 ($ID3^{AB}$, $ID8^{AB}$, $ID1^{AB}$, $ID7^{AB}$) with source 105. This may be referred to as Round 2 encryption. Source 105 similarly performs Round 2 encryption by re-encrypting source 110a's Round 1 data ($ID1^B$, $ID2^B$, $ID4^B$, $ID7^B$), randomizes (e.g., shuffles) the resulting rows, and shared the resulting encrypted data 330 ($ID2^{BA}$, $ID1^{BA}$, $ID4^{BA}$, $ID7^{BA}$) with source 110a.

The Round 2 encrypted data ($ID3^{AB}$, $ID8^{AB}$, $ID1^{AB}$, $ID7^{AB}$) and ($ID2^{BA}$, $ID1^{BA}$, $ID4^{BA}$, $ID7^{BA}$) may be compared to identify matches, e.g., to produce a match count. In this example, the encryptions were commutative (i.e., the order of encryption does not affect the ability to compare). Accordingly, the twice encrypted values can be matched with one another even where one of the values being matched is encrypted first using private encryption key A and then with private encryption key B and the other of the values being matched is encrypted first using encryption key B and then with encryption key A. Specifically, $ID1^{AB}$ can be matched with $ID1^{BA}$ without decrypting the data and $ID7^{AB}$ can be matched with $ID7^{BA}$ without decrypting the data. In this example, match service 220 of source 105 includes a match service 220 that performs such matching and determines that there are 2 matches and provides an output match count 340 that indicates that there are 2 matches. The output of the match process may include size information, e.g., both input file sizes (unmatched device counts) as well as the resulting intersection match size.

In this example, since all data is encrypted using separate private keys from source 105 and source 110*a*, Round 1 encryption and Round 2 encryption results may be stored. Round 2 encryption results may be used for comparison later as long as the keys remain unchanged.

Figure 4:
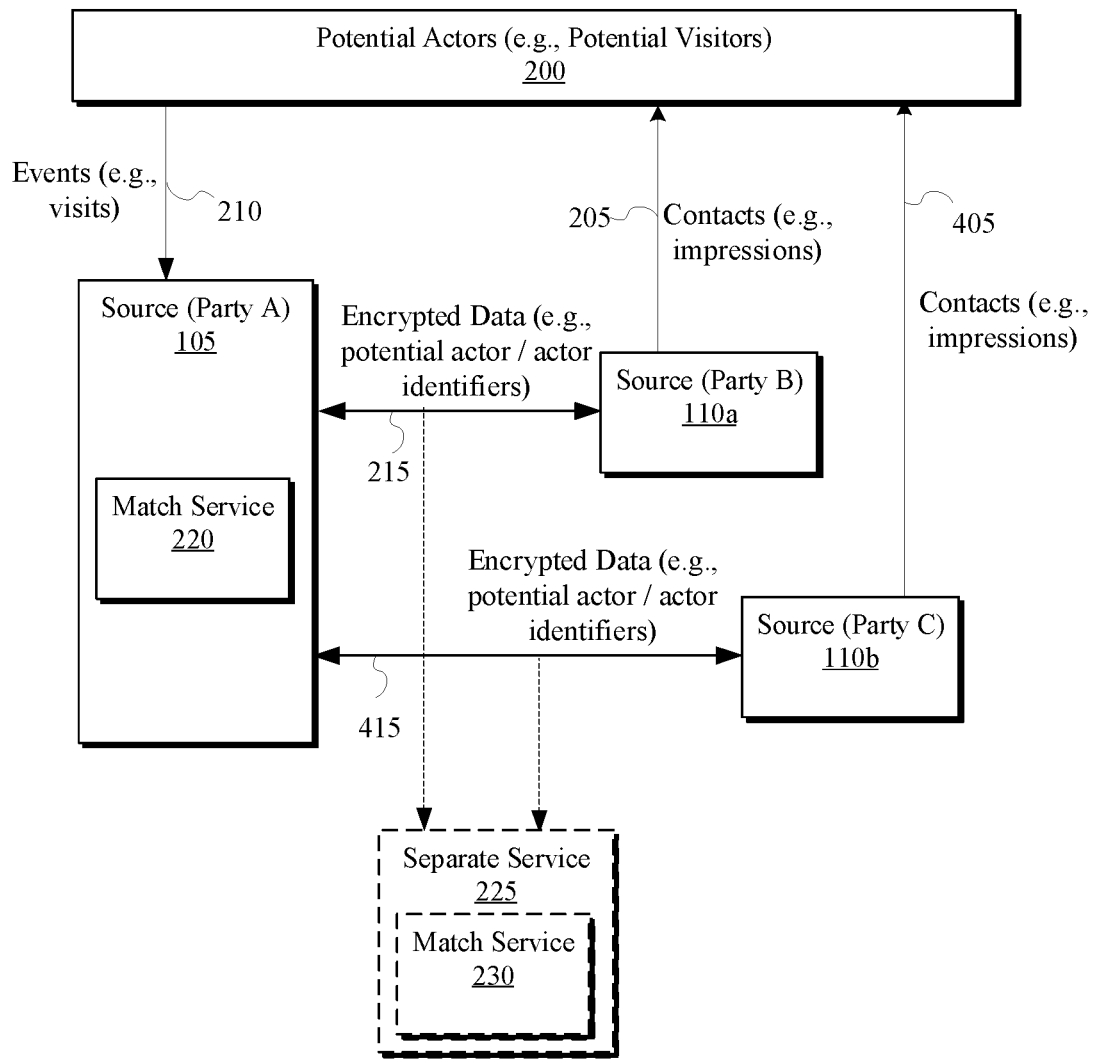
FIG. 4 illustrates example communications and determinations of a match service involving three sources according to some implementations disclosed herein.

FIG. 4 illustrates example communications and determinations of a match service involving three sources. Source 110*a* provides contacts 205 with some (i.e., a subset) of the potential actors 200 and source 110*b* provides contacts 405 with some (i.e., a subset) of the potential actors 200. In FIG. 4, source 105 compiles private data about events 210 (e.g., visits) in which a subset of the potential actors 200 participated.

Encrypted data (e.g., potential actor/actor identifiers) 215 is exchanged between the source 105 and the source 110*a*. Encrypted data (e.g., potential actor/actor identifiers) 415 is also exchanged between the source 105 and the source 110*b*. The match service 220 compares the exchanged data 215, 415 to identify matches. For example, this may involve determining how many events 210 were attributable to only source 110*a* contacts 205, how many events 210 were attributable to only source 110*b* contacts 405, and how many events 210 where attributable to both source 110*a* contacts 205 and source 110*b* contacts 405. Moreover, where both source 110*a* contacts 205 and source 110*b* contacts 405 are credited with events 205, the amount of contribution given to 110*a* and 110*b* may be determined based on additional homomorphic attributes (e.g., impression counts) included in the matched data, as explained further below.

In another example, a separate device (and/or business entity) performs the comparison of data from multiple sources. For example, data exchanged between source 105 and source 110*a* may be compared by match service 230 of separate service 225.

Exemplary Encrypted Commutative Match Technique

Some implementations disclosed herein use an added unique attribute (e.g., anonymous unique homomorphic identifiers) and randomization to enable matching encrypted identifiers across multiple encrypted sources. The unique attributes uniquely identify associated encrypted identifiers without requiring first private key decryption. In one example, the unique attributes uniquely identify associated encrypted identifiers without requiring first private key decryption because the unique attributes are unique homomorphic identifiers. In another example, the unique attributes uniquely identify associated encrypted identifiers without requiring first private key decryption because the unique attributes are unique clear text values that are not encrypted. In another example, the unique attributes uniquely identify associated encrypted identifiers without requiring first private key decryption because the unique attributes are encrypted using another encryption technique/key.

This matching based on the added unique attribute enables both (a) multi-touch attribution (MTA) and (b) identifying a control group that includes only identifiers that do not match identifiers from other sources (e.g., selecting the subset of identifiers in a control group candidate set that were not exposed to ads by any of one or more secondary providers).

Figure 5:
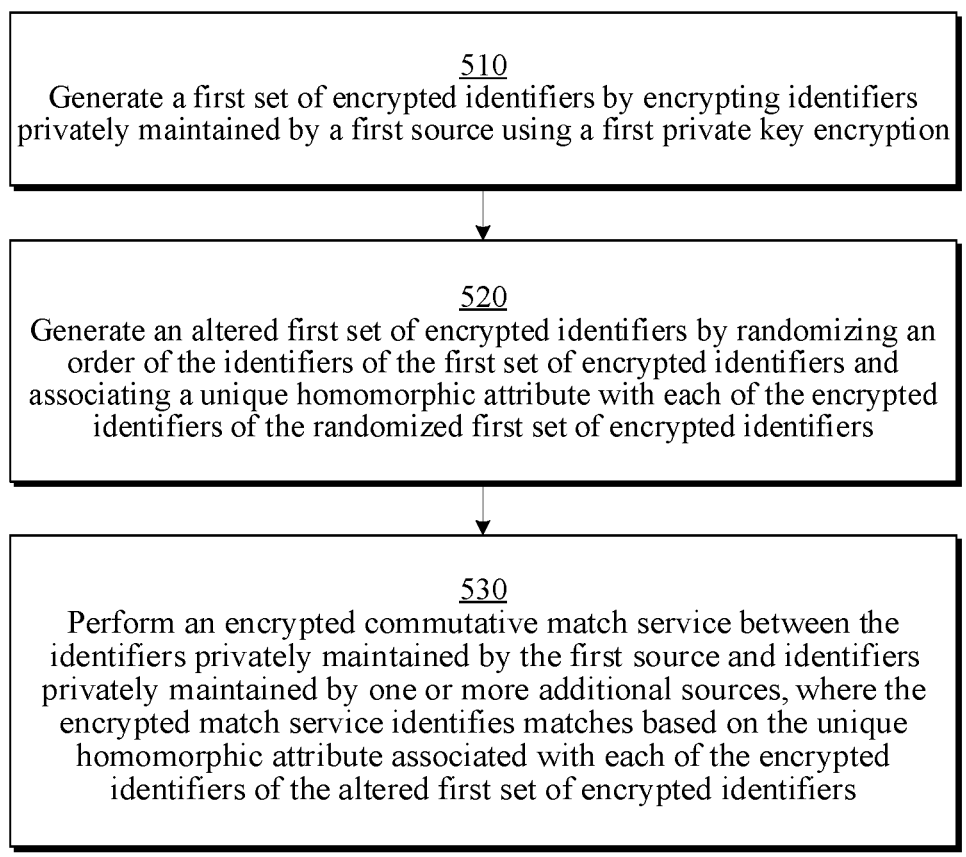
FIG. 5 is a flow chart illustrating an exemplary method for performing an encrypted commutative match service according to some implementations disclosed herein.

FIG. 5 is a flow chart illustrating an exemplary method 500 for performing an encrypted commutative match service. The exemplary method 500 can be implemented via a computing device, for example, by using a processor to execute instructions stored in a non-transitory computer-readable medium. Reference to the method 500 being performed by a computing device includes the method 500 being performed by one or more computing devices and/or using one or more processors.

At block 510, the method 500 generates a first set of encrypted identifiers by encrypting identifiers privately maintained by a first source using a first private key encryption.

At block 520, the method 500 generates an altered first set of encrypted identifiers by randomizing an order of the identifiers of the first set of encrypted identifiers and associating a unique homomorphic attribute with each of the encrypted identifiers of the randomized first set of encrypted identifiers. This may involve shuffling and associating unique homomorphic attributes (with the value p). In one example, associating the unique homomorphic anonymous attribute with each of the encrypted identifiers of the randomized first set of encrypted identifiers involves assigning an anonymous, homomorphic unique identifier to each of the encrypted identifiers of the randomized first set of encrypted identifiers.

At block 530, the method 500 performs an encrypted commutative match service between the identifiers privately maintained by the first source and identifiers privately maintained by one or more additional sources, where the encrypted match service identifies matches based on the unique homomorphic attribute associated with each of the encrypted identifiers of the altered first set of encrypted identifiers.

Some implementations identify data matches by comparing twice encrypted values. For example, a first source may send the altered first set of encrypted identifiers to a second source and a third source, receive a second set of encrypted identifiers originating from the second source and encrypted using a second private encryption key, and receive a third set of encrypted identifiers originating from the third source and encrypted using a third private encryption key. The first source may generate a first set of twice encrypted identifiers by encrypting the second set of encrypted identifiers originating from the second source with the first encryption key and generate a second set of twice encrypted identifiers by encrypting the third set of encrypted identifiers originating from the third source with the first encryption key. The data may be shuffled and may include one or more homomorphic attribute values, e.g., number of impressions sent to each potential actor.

The first source may receive a third set of twice encrypted identifiers comprising the first set of encrypted identifiers encrypted by the second source using the second encryption key and a fourth set of twice encrypted identifiers comprising the first set of encrypted identifiers encrypted by the third source using the third encryption key.

One or more comparisons may then be performed to identify matches amongst the twice encrypted data corresponding to the data maintained by the sources. A comparison may be performed to identify a first set of matches between the first source and the second source using the first and third sets of twice encrypted identifiers. A comparison may be performed to identify a second set of matches between the first source and the third source using the second and fourth sets of twice encrypted identifiers. A comparison may be performed to identify a third set of matches between the first source and both the second and third sources using the unique anonymous homomorphic attributes (with the value p) in the altered first set of encrypted identifiers, the third set of twice encrypted identifiers, and the fourth set of twice encrypted identifiers. Examples of such comparisons are provided below with reference to FIG. 6.

In the method 500 of FIG. 5, encryption, randomization, and the use of a unique homomorphic attribute (p) provide various advantages. For example, these features provide privacy while allowing N-way matching using the unique homomorphic attribute (p). In some implementations, the matching technique performed by a match service as illustrated in FIG. 5 is used to determine multi-touch attribution (MTA), where an identifier privately maintained by the first source is matched with an identifier privately maintained by each of N additional sources, e.g., matched with both an identifier privately maintained by a second source and an identifier privately maintained by a third source. In some implementations, the identifier of a second source is associated with a first number of actions (e.g., contacts, impressions), the identifier of a third source is associated with a second number of actions (e.g., contacts, impressions), and the multi-touch attribution attributes an events (e.g., store visit, purchase, webpage view, or any other conversion) tracked by the identifier of the first source with both the first number of actions of the second source and the second number of actions of the third source.

In some implementations, the matching technique performed by a match service as illustrated in FIG. 5 is used to identify a control group that includes only identifiers that do not match identifiers from N additional sources (e.g., selecting the subset of identifiers in a control group candidate set that were not exposed to ads by any of one or more secondary providers.

In some implementations, homomorphic encryption on attribute columns associated with the match-keys (e.g., additional homomorphic values corresponding to impressions, and other data) further enables parties to exchange attribute information in a private environment. The attributes can be used for impression frequency, campaign targeting subdimensions, audience attributes related to the population being exposed, or any other data type relevant to the particular use case being implemented. In one example, using homomorphic attributes, the values can be decrypted via a public key, and examined individually or in aggregate, for example, to calculate multi-touch attribution (MTA) contribution, targeting contribution by sub-dimension, or as input to building a control group.

Figure 6:
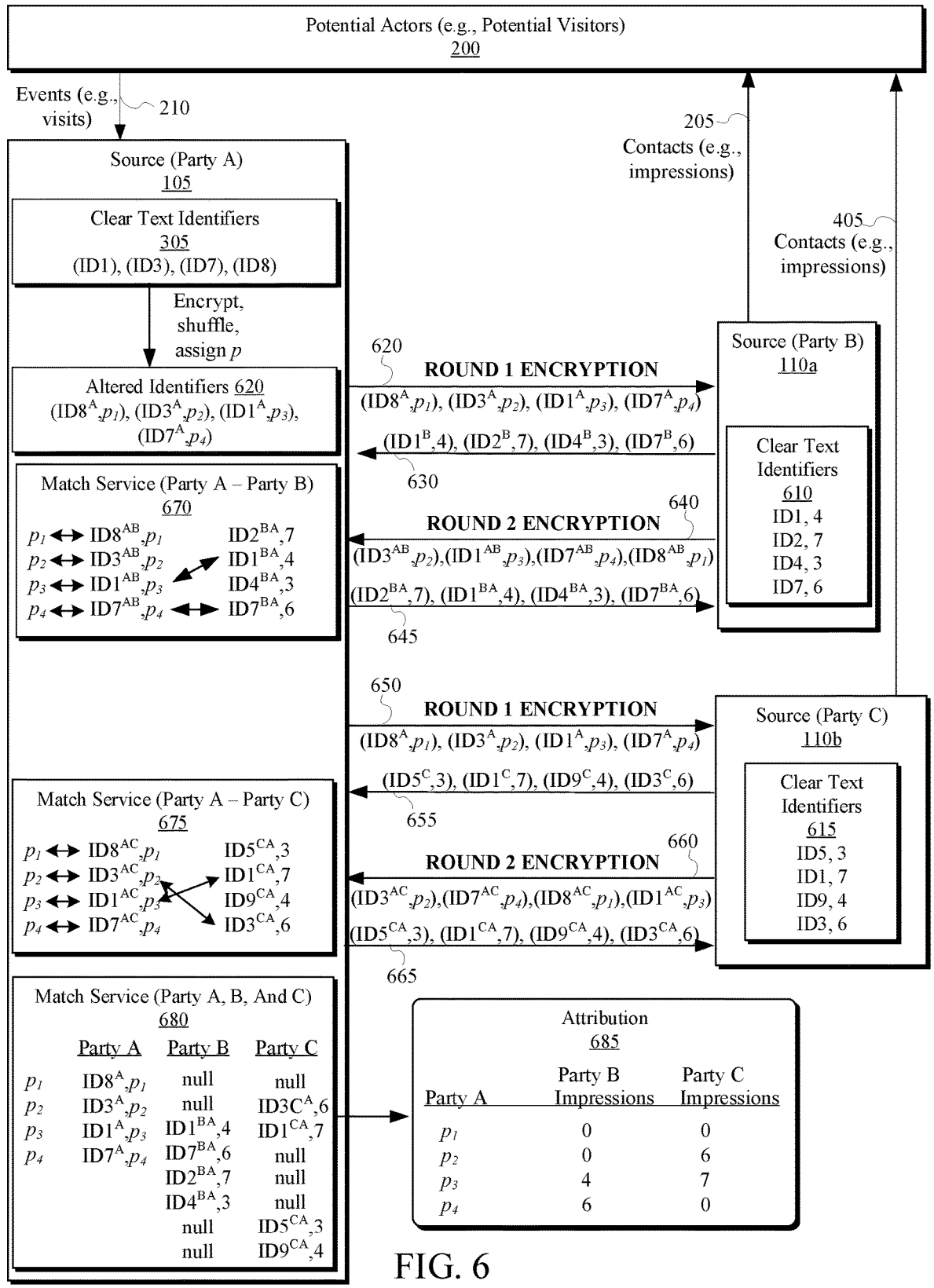
FIG. 6 illustrates example communications and determinations of a match service involving three sources according to some implementations disclosed herein.

FIG. 6 illustrates example communications and determinations of a match service involving three sources to illustrate an example of the method 500 of FIG. 5. The method 500 of FIG. 5, however, is not limited to these exemplary communications and determinations and/or can involve a different number of sources (e.g., two source, four sources, five sources, . . . N sources).

In FIG. 6, source 110a provides contacts 205 with some (i.e., a subset) of the potential actors 200 and source 110b provides contacts 405 with some (i.e., a subset) of the potential actors 200. Source 105 compiles private data about events 210 (e.g., visits) in which a subset of the potential actors 200 participated, e.g., maintaining a list of the e-mail addresses (or other unique identifier) of a subset of the potential actors 200 that visited a store (e.g., physical or online) to purchase a product from source 105.

In the example of FIG. 6, source 105 privately maintains clear text identifiers 305 (ID1, ID3, ID7, ID8) corresponding to the subset of the potential actors 200 who participated in events 210, e.g., visits or other desired actions. Source 105 generates a first set of encrypted identifiers (e.g., $ID1^A$, $ID3^A$, $ID7^A$, $ID8^A$) by encrypting the clear text identifiers 305 (e.g., ID1, ID3, ID7, ID8) privately maintained by source 105 using a first private key encryption (e.g., encryption key A). Source 105 shuffles the encrypted identifiers and assigns unique homomorphic attributes (with value p) to generate an altered first set of encrypted identifiers 620 (($ID8^A,p_1$), ($ID3^A,p_2$), ($ID1^A,p_3$), ($ID7^A,p_4$)).

Source 105 sends the altered first set of encrypted identifiers 620 (($ID8^A,p_1$), ($ID3^A,p_2$), ($ID1^A,p_3$), ($ID7^A,p_4$)) to source 110a. This may be referred to as "Round 1 encryption." Source 110a also performs Round 1 encryption by encrypting the clear text identifiers and data 610 ((ID1, 4), (ID2, 7), (ID4, 3), (ID7, 6)) that it maintains using encryption key B to produce encrypted identifiers and homomorphic attribute data 630 (($ID1^B$, 4), ($ID2^B$, 7), ($ID4^B$, 3), ($ID7^B$, 6)), which it sends to source 105.

Source 110a re-encrypts source 105's Round 1 data (($ID8^A,p_1$), ($ID3^A,p_2$), ($ID1^A,p_3$), ($ID7^A,p_4$)), randomizes (e.g., shuffles) the resulting rows, and shares the resulting double-encrypted data 640 (($ID3^{AB},p_2$), ($ID1^{AB},p_3$), ($ID7^{AB},p_4$), ($ID8^{AB},p_1$)) with source 105. This may be referred to as Round 2 encryption. Source 105 also performs Round 2 encryption by re-encrypting source 110a's Round 1 data (($ID1^B$,4), ($ID2^B$,7), ($ID4^B$,3), ($ID7^B$,6)), randomizing (e.g., shuffling) the resulting rows, and sharing the resulting double-encrypted data 645 (($ID2^{BA}$,7), ($ID1^{BA}$,4) ($ID4^{BA}$,3), ($ID7^{BA}$,6)) with source 110a.

The Round 2 encrypted data including encrypted data 640 (($ID3^{AB},p_2$), ($ID1^{AB},p_3$), ($ID7^{AB},p_4$), ($ID8^{AB},p_1$)) and encrypted data 645 (($ID2^{BA}$,7), ($ID1^{BA}$,4), ($ID4^{BA}$,3), ($ID7^{BA}$,6)) may be compared to identify matches between the source 105 and the source 110a. In this example, the encryptions were commutative (i.e., the order of encryption does not affect the ability to compare). Accordingly, the twice encrypted values can be matched with one another even where one of the values being matched is encrypted first using encryption key A and then with encryption key B and the other of the values being matched is encrypted first using encryption key B and then with encryption key A. Specifically, ($ID1^{AB},p_3$) can be matched with ($ID1^{BA}$,4) without decrypting the data and ($ID7^{AB},p_4$) can be matched with ($ID7^{BA}$,6) without decrypting the data. In this example, the matching is based on the double-encrypted match keys not the homomorphic attributes. In this example, match service 670 of source 105 performs the matching.

Source 105 also sends the altered first set of encrypted identifiers 650 (($ID8^A,p_1$), ($ID3^A,p_2$), ($ID1^A,p_3$), ($ID7^A,p_4$)) to source 110b. This may be referred to as "Round 1 encryption." Source 110b also performs Round 1 encryption by encrypting the clear text identifiers and data 615 ((ID5, 3), (ID1, 7), (ID9, 4), (ID3, 6)) that it maintains using encryption key C to produce encrypted identifiers and data 655 (($ID5^C$,3), ($ID1^C$,7), ($ID9^C$,4), ($ID3^C$,6)), which it sends to source 105.

Source 110b re-encrypts source 105's Round 1 data (($ID8^A,p_1$), ($ID3^A,p_2$), ($ID1^A,p_3$), ($ID7^A,p_4$)), randomizes (e.g., shuffles) the resulting rows, and shares the resulting double-encrypted data 660 (($ID3^{AC},p_2$), ($ID7^{AC},p_4$), ($ID8^{AC},p_1$), ($ID1^{AC},p_3$)) with source 105. This may be referred to as Round 2 encryption. Source 105 also performs Round 2 encryption by re-encrypting source 110b's Round 1 data (($ID5^C$,3), ($ID1^C$,7), ($ID9^C$,4), ($ID3^C$,6)), randomizing (e.g., shuffling) the resulting rows, and sharing the resulting double-encrypted data 665 (($ID5^{CA}$,3), ($ID1^{CA}$,7), ($ID9^{CA}$,4), ($ID3^{CA}$,6)) with source 110b.

The Round 2 encrypted data including encrypted data 660 (($ID3^{AC}$,$p_2$), ($ID7^{AC}$,$p_4$), ($ID8^{AC}$,$p_1$), ($ID1^{AC}$,$p_3$)) and encrypted data 665 (($ID5^{CA}$,3), ($ID1^{CA}$,7), ($ID9^{CA}$,4), ($ID3^{CA}$,6)) may be compared to identify matches between the source 105 and the source 110b. In this example, the encryptions were commutative (i.e., the order of encryption does not affect the ability to compare). Accordingly, the twice encrypted values can be matched with one another even where one of the values being matched is encrypted first using encryption key A and then with encryption key C and the other of the values being matched is encrypted first using encryption key C and then with encryption key A. Specifically, ($ID3^{AC}$,$p_2$) can be matched with ($ID3^{CA}$,6) without decrypting the data and ($ID1^{AC}$,$p_3$) can be matched with ($ID1^{CA}$,7) without decrypting the data. In this example, match service 675 of source 105 performs such matching.

A comparison may additionally (or alternatively) be performed to identify matches between source 105 and both second 110a and source 110b using the unique anonymous homomorphic attributes (p) and/or the twice encrypted identifiers (i.e., the output of the Round 2 encryptions). In this example, the anonymous identifier $p_1$ matches with ($ID8^A$,$p_1$) which does not match with data in source 110a or source 110b. Anonymous identifier $p_2$ matches with ($ID3^A$,$p_2$) which does not match with data in source 110a but does match with ($ID3C^A$,6) in source 110b. Anonymous identifier $p_3$ matches with ($ID1^A$,$p_3$), which matches with ($ID1^{BA}$,4) in source 110a and matches with ($ID1^{CA}$,7) in source 110b. Anonymous identifier $p_4$ matches with ($ID7^A$,$p_4$), which matches with ($ID7^{BA}$,6) in source 110a but does not match with data in source 110b. Moreover, the matching may determine that data from source 110a (($ID2^{BA}$,7) and ($ID4^{BA}$,3)) does not match data from source 105 and that data from source 110b (($ID5^{CA}$,3), ($ID9^{CA}$,4) does not match data from source 105. In this example, match service 675 of source 105 performs such matching.

The comparison can be used to, among other things, provide attribution 685. Attribution 685 shows that one anonymous event known by $p_1$ (anonymously associated with ($ID8^A$,$p_1$)) was not associated with (e.g., at least partially influenced by) contacts 205 of source 110a or contacts 405 of source 110b. Accordingly, no attribution credit may be given to either source 110a or 110b for this event. The attribution 685 shows that one anonymous event known by $p_2$ (anonymously associated with ($ID3^A$,$p_2$)) was not associated with the contacts 205 of source 110a but was associated with some of the contacts 405 (e.g., 4 impressions) of source 110b. Source 105 may attribute full credit to source 110b for this event. The attribution 685 shows that one anonymous event known by $p_3$ (anonymously associated with ($ID1^A$,$p_3$)) was associated with some of the contacts 205 (e.g., 4 impressions) of source 110a and associated with some of the contacts 405 (e.g., 7 impressions) of source 110b. Source 105 may attribute partial credit (e.g., 4/11 of the credit) to source 110a and partial credit (e.g., 7/11 of the credit) to source 110b. The attribution 685 further shows that one anonymous event known by $p_4$ (anonymously associated with ($ID7^A$,$p_4$)) was associated with contacts 205 (e.g., 6 impressions) of source 110a but was not associated with the contacts 405 of source 110b. Source 105 may attribute full credit to source 110a for this event.

Multi-Touch Attribution (MTA) Example

Figure 7:
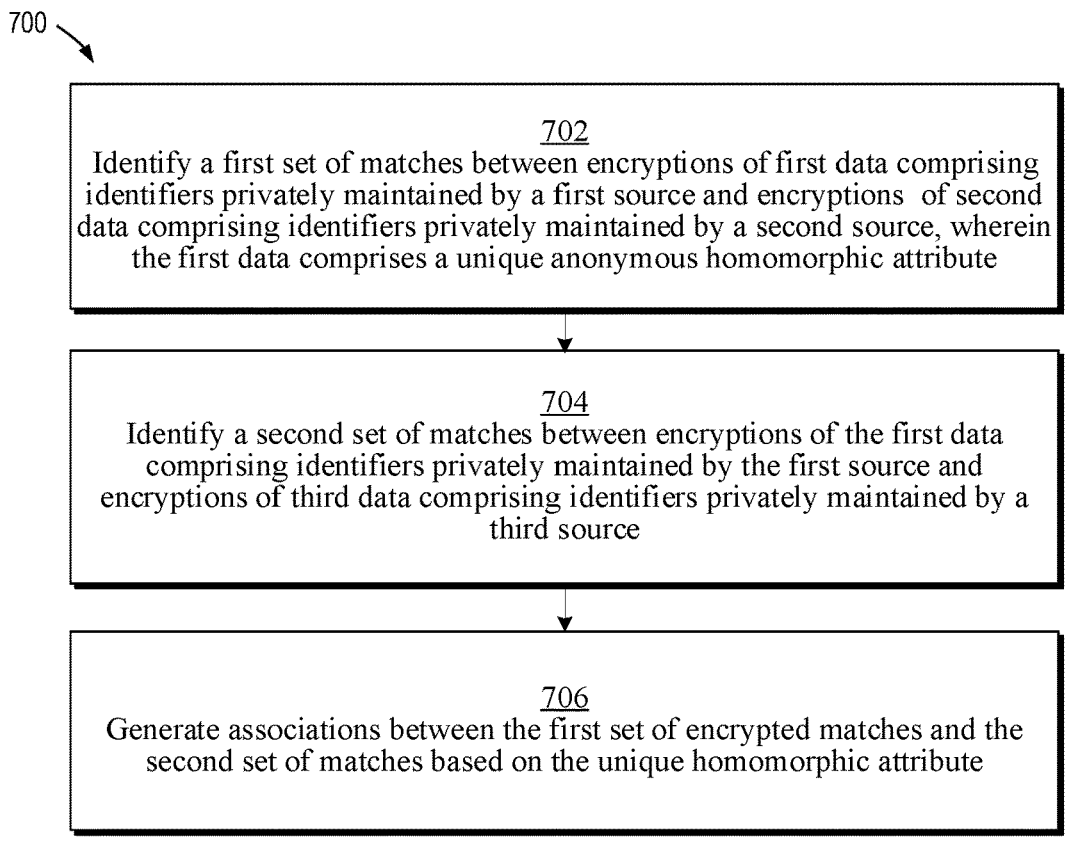
FIG. 7 is a flow chart illustrating an exemplary method for associating matches based on a unique, homomorphic attribute according to some implementations disclosed herein.

FIG. 7 is a flow chart illustrating an exemplary method 700 for associating matches based on a unique, homomorphic attribute. The exemplary method 700 can be implemented via a computing device, for example, using a processor to execute instructions stored in a non-transitory computer-readable medium. Reference to the method 700 being performed by a computing device includes the method being performed by one or more computing devices and/or using one or more processors.

At block 702, the method 700 identifies a first set of matches between encryptions of first data comprising identifiers privately maintained by a first source and encryptions of second data comprising identifiers privately maintained by a second source, wherein the first data comprises a unique anonymous homomorphic attribute. For example, this may involve identifying matches based on comparing (a) identifiers maintained by the first source after encryption by the first source and then re-encryption by the second source with (b) identifiers maintained by the second source after encryption by the second source and then re-encryption by the first source. Identifying the first set of matches may involve comparing (a) identifiers privately maintained by the first source after encryption and randomization by the first source and then re-encryption by the second source with (b) identifiers privately maintained by the second source after encryption by the second source and then re-encryption by the first source. Identifying the matches may involve matching such as was described above with respect to the matching service 670 in the example of FIG. 6.

At block 704, the method 700 identifies a second set of matches between encryptions of the first data comprising identifiers privately maintained by the first source and encryptions of third data comprising identifiers privately maintained by a third source. For example, this may involve identifying matches based on comparing (a) identifiers maintained by the first source after encryption by the first source and then re-encryption by the third source with (b) identifiers maintained by the third source after encryption by the second source and then re-encryption by the first source. Identifying the second set of matches may involve comparing (a) identifiers privately maintained by the first source after encryption and randomization by the first source and then re-encryption by the third source with (b) identifiers privately maintained by the third source after encryption by the third source and then re-encryption by the first source. Identifying the matches may involve matching such as was described above with respect to the matching service 675 in the example of FIG. 6.

At block 706, the method generates associations (e.g., for a multi-touch attribution) between the first set of encrypted matches and the second set of matches based on the unique homomorphic attribute. This may involve maintaining an altered first set of encrypted identifiers (e.g. ($ID8^A$,$p_1$), ($ID3^A$,$p_2$), ($ID1^A$,$p_3$), ($ID7^A$,$p_4$)) that is matched against both the first set of matches and the second set of matches as described above with respect to the matching service 680 in the example of FIG. 6. Accordingly, generating the associations may involve generating an altered first set of encrypted randomized identifiers based on the first data and the unique homomorphic attribute (p), matching the altered first set of encrypted identifiers with the encryptions of the first data of the first set of matches and matching the altered first set of encrypted identifiers with the encryptions of first data of the second set of matches.

Some implementations enable MTA in which only encrypted data, Elliptical Curve Cryptography (ECC), and/or homomorphic data is ever exchanged between any two parties. To calculate MTA among multiple publishers (1 to N), a primary provider Party A, using the same Private Key A, can compare Party A encrypted and anonymized data with multiple other secondary providers (Parties B and C acting as publishers) to determine if the same anonymous candidate $IDX^A$, $p_n$, has a match in Party B's dataset as well as a match in Party C's data-set without ever knowing what the original clear-text value is in any of the datasets. Moreover, no data need ever be exchanged between Parties B and C.

In order to asynchronously determine if the primary provider's (Party A) Round 1 ID matches an ID in the Party B data-set and also matches an ID in Party C's data-set, storage of the Round 1 encrypted IDs and Round 2 encrypted IDs is required so the match process can be run ad-hoc, and run against the same Round 1 and Round 2 data sets for multiple N secondary providers.

A illustrated in FIG. 6 (at 685), once a match has been established, the homomorphic attribute values from each of the matched secondary providers may be appended to the matched candidate. If there is no match, values of zero (e.g., 0, null) are added to the candidate on behalf of the secondary provider by the primary provider.

Adding secondary attributes to matched and unmatched anonymous data to calculate MTA might follow a scenario similar to the example below. Assume Party A is the primary provider of visits to stores, while Party B and C, both acting as secondary providers, submit exposed data for advertising campaigns that they are running in an attempt to drive shoppers to the stores. Party A submits the clear-text visitor IDs as the match-key. Party B submits the exposed ID and the number of impressions that the ID has been exposed to for the campaign. Additional homomorphic values could also optionally be appended to the exposures. Party C also submits the exposed ID and the number of impressions the ID has been exposed to cumulative-to-date for the campaign. Additional homomorphic values could also optionally be appended to the exposures.

| Party A (primary) | Party B (secondary) | Party C (secondary) |
|---|---|---|
| ID1 | ID1, 4 | ID3, 5 |
| ID2 | ID3, 2 | ID4, 6 |
| ID4 | ID4, 1 | ID6, 3 |
| ID7 | ID7, 3 | ID13, 4 |
| ID9 | ID15, 4 | ID9, 6 |

Through ECC, Party A, in Round 1, encrypts and shuffles the inbound visit data, and assigns a homomorphic anonymous unique identifier to the encrypted Round 1 data such that after the Round 2 encryption by Party B or C, the anonymous identifier can determine that $ID1p^{AB}$ matches $ID1^{BA}$ to and does not match to any IDs in Party C's data-set. This encryption and shuffling process keeps the data private while allowing for N-way matching via the anonymous identifier p. In addition, through ECC, Party A can determine that $ID4p^{AB}$ matches both Party B's $ID4^{BA}$ and Party C's $ID4^{CA}$ $ID7^{AB}$ and $ID9^{AB}$ also have matches to Party B $ID7^{BA}$ and Party C $ID7^{CA}$ respectively. Using the homomorphic decryption of Party B and Party C's number of impression columns, as well as non-matching attributes, the output of the match between Party A, B and C results in the following:

| Party A Candidate | Party B impressions | Party C impressions |
|---|---|---|
| $ID1p^A$ | 4 | 0 |
| $ID2p^A$ | 0 | 0 |
| $ID4p^A$ | 1 | 6 |
| $ID7p^A$ | 3 | 0 |
| $ID9p^A$ | 0 | 6 |

In this example, no party knows the identity of the visitor or the exposed because they are encrypted with ECC, but it is known that the anonymous visitor candidate ID p from the primary provider (Party A) was exposed or not exposed to a specific number of advertising impressions by the respective secondary providers (Parties B and C, . . . N) since those values are encrypted and decrypted via homomorphic encryption and are carried through into Round 2 results as B and C re-encrypt Party A's Round 1 data.

Note that $IDX^{BA}$ does not equal $IDX^{CA}$ and $IDX^{AB}$ does not equal $IDX^{AC}$ since B and C's private keys are different, thus the double encryption results are different. The matching is performed on Party A's anonymous identifier p after $IDX^A$ is encrypted, shuffled and double encrypted by both parties B and C. Anonymous random identifier p is assigned after Round 1 encryption and post shuffling the Round 1 results. Anonymous identifier p will be different each time Round 1 is performed on any primary provider's dataset. Therefore, daily inputs into the system even if they contain the same clear-text visit ID will have a different identifier p each day.

The combined data is not shared with any secondary provider and may be stored on the central storage since pattern matching that yields enough uniqueness could be used to reverse engineer back to the original clear-text IDs, as well as cross-leaking secondary provider information regarding another party's campaign tactics, etc.

MTA Computation Examples

MTA may involve comparisons that involve data that is obtained over time, e.g., each day new data may be obtained. MTA calculations may be performed using various timing strategies to provide accuracy while utilizing processing resources and time efficiently. In some implementations, MTA is based on per visit attribution using post exposure visits (including visitors & non-visitors on a daily basis). A daily user match may be performed against both visitors and non-visitors. In some implementations, MTA is based on per visit attribution using post exposure visits (including only visitors on a daily basis). A daily user match may be performed against only visitors. In some implementations, MTA is based on cumulative to-date (CTD) attribution without post exposure visits (including visitors & non-visitors on a daily basis). In some implementations, MTA may be based on matching visitors on a daily basis and matching non-visitors on a per-report basis.

A first exemplary MTA computation method matches multi-source data for each of multiple time segments (e.g., daily) to calculate (a) the number of contacted actors (e.g., exposed users/potential visitors) during each of the time segments (e.g., daily) that are attributable to each of the sources (e.g., publishers) and (b) the number of contacted events (e.g., exposed visits) during each of the time segments (e.g., daily) attributable to each of the sources (e.g., publishers). These time segment-specific values are aggregated for an entire time period (e.g., monthly). These aggregated contacted event and contacted actor values are combined to provide a contacted event rate for each source.

Specifically, the contacted event rate equals the events attributed to the source divided by the actors attributed to the source (e.g., an exposed visit rate for a publisher equals the visits attributed to the publisher divided by the users attributed to the publisher). The contacted event rate for each source (e.g., exposed visit rate by publisher) can then be combined with a common uncontacted event rate (e.g., unexposed visit rate) to produce an analysis per source (e.g., a lift analysis of impression effectiveness per publisher).

In some implementations, an MTA computation is based on a daily match of all users, including both visitors and non-visitors, between Party A and each of the one or more publisher partners on a media campaign (e.g., Parties B and C). The daily match intersects single day users (including visitors and non-visitors) as measured by Party A with ad exposures cumulative to date for each of the multiple publishers (Parties B and C) on the media plan.

Let $U_t^A$ represent the users (including both visitors and non-visitors) observed by Party A on day t. We will also let $E_t^B$ and $E_t^C$ represent users exposed cumulative to date (CTD) through day t by Parties B and C respectively. The data file $E_t^X$ will include both the commutatively encrypted MAIDs and also the homomorphically encrypted integer number of impressions served to the device CTD up to date t inclusively.

Each day t from the start of campaign through the end of the measurement period (typically end of campaign plus a cool-off period to capture the latent effect of advertising served late in the campaign). The three parties A, B, & C submit their daily files $U_t^A$, $E_t^B$, and $E_t^C$ to the EMS system for encrypted matching. The three-way intersection of these daily files produces a daily data set of the form:

| Party A id | Part A visits | Party B impressions | Party C impressions |
|---|---|---|---|
| ID3$^A$p | 0 | 0 | 6 |
| ID1$^A$p | 1 | 5 | 7 |
| ID8$^A$p | 1 | 1 | 2 |
| ID7$^A$p | 0 | 6 | 0 |

Each day t, these data are used to calculate daily user level MTA weights. Each user's daily MTA weights represent the percentage of that user's total impressions CTD served on publishers B and C respectively through day t. In the example above, this would be:

| Party A id | Part A visits | Party B MTA | Party C MTA |
|---|---|---|---|
| ID3$^A$p | 0 | 0.000 | 1.000 |
| ID1$^A$p | 1 | 0.416 | 0.583 |
| ID8$^A$p | 1 | 0.333 | 0.666 |
| ID7$^A$p | 0 | 1.000 | 0.000 |

Notice that for each user receiving impressions, their MTA weights will sum to 1 across publishers (example results may not sum exactly due to rounding). These user level MTA weights are applied to attribute a fraction of the user and their visits to each of the publishers B and C.

Results are aggregated across users each day; using publisher C as an example this provides:

$$N_t^{eC} = \sum_{i=1}^{N_t^e} \alpha_i^C$$

This means the number of exposed users fractionally assigned to publisher C on day t is the sum of user level MTA weights $\alpha_i^C$ across all exposed users i=1, 2, 3, ..., $N_t^e$ for that day. Fractionally assigned visits for the same day will be $$V_t^{eC} = \sum_{i=1}^{N_t^e} v_t^i \times \alpha_i^C$$

The weighted sum of visits across users using the publisher C MTA weights $\alpha_i^C$ for that day. User visits for any single day will be either zero, or one, $v_t^i \in \{0, 1\} \forall t, i$ because not all users visit but visits are capped at 1 visit per user per location per day for those users who do visit. Similar calculations provide the daily number of exposed users $N_t^{eB}$ and the daily number of exposed visits $V_t^{eB}$ attributed to publisher B.

The daily match process described above is completed for each day t—1, 2, 3, ..., T in the reporting period. The daily values $N_t^{eC}$ and $V_t^{eC}$ are aggregated by summing across dates in the reporting period through day T:

$$N^{eC}(T) = \sum_{t=1}^{T} N_t^{eC} \quad V^{eC}(T) = \sum_{t=1}^{T} V_t^{eC}$$

And similarly for $N_{eB}(T)$ and $V_{eB}(T)$.

The aggregated values for exposed users and exposed visits by publisher can be combined to produce an exposed visit rate for each publisher:

$$EVR^C(T) = \frac{V^{eC}(T)}{N^{eC}(T)} \quad EVR^B(T) = \frac{V^{eB}(T)}{N^{eB}(T)}$$

The exposed visit rates by publisher can then be combined with a common unexposed visit rate, calculated separately without the need of MTA since the unexposed/control population does not receive any ad exposures, to produce a lift analysis of ad effectiveness by publisher. The definition of the MTA weights $\alpha_i^{B|C}$ and some simple algebra implies:

$$N^e(T) = N^{eB}(T) + N^{eC}(T)$$

$$V^e(T) = V^{EB}(T) + V_{eC}(T)$$

These relationships between overall users and visits to the publisher specific values for users and visits assures sensible alignment of results between overall and publisher.

A second exemplary MTA computation method matches multi-source data at the end of a time period that has multiple segments to calculate cumulative-to-data attribution. It uses cumulative-to-date values for both events (e.g., visits) and contacts (e.g., impressions) for an entire time period (e.g., month). This attribution is thus based on all events (e.g., visits) rather than being limited to post-contact events (e.g., post exposure visits) as in method 1 but may be less computationally intensive than method 1. A single inter-party match at the end of the time period (e.g., on the report date) is between actors with events (e.g., users with visits) cumulative to date and the contacts per source (e.g., exposure files) cumulative to date. As with method 1, these values are combined to provide a contacted event rate (e.g., an exposed visit rate) for each source (e.g., publisher). As with method 1, the contacted event rate for each source (e.g., exposed visit rate by publisher) can then be combined with a common uncontacted event rate (e.g., unexposed visit rate) to produce an analysis per source (e.g., a lift analysis of contact effectiveness per publisher).

In some implementations, an MTA computation reduces compute by requiring a match between parties A, B, and C only once per reporting period rather than once per day as described first example above. The single inter-party match in this example is between Party A users with visits cumulative to date (CTD) and cumulative to date ad exposures from Parties B and C

| Party A id | A Users | A visits(CTD) | B impressions (CTD) | C impressions (CTD) |
|---|---|---|---|---|
| ID3$^A$p | 1 | 0 | 0 | 6 |
| ID1$^A$p | 1 | 8 | 5 | 7 |
| ID8$^A$p | 1 | 3 | 4 | 4 |
| ID7$^A$p | 1 | 2 | 6 | 0 |

The data provided to the EMS match process by Party A now includes the additional data element of CTD visits passed as a homomorphically encrypted feature for each commutatively (and homomorphically) encrypted MAID IDx$^A$p. Both visits from Party A and impressions from Parties B and C are cumulative to date through the end of the reporting period T. Because visits and impressions are measured CTD through date T, the attribution in this example will also be cumulative to date rather than per visit attribution described in first example. Furthermore, the attribution this example will be based on all visits and not on post-exposure visits as it was in first example. All visits in the reporting period will be fractionally attributed to publishers using all impressions in the reporting period even though impressions served late in the campaign may be served after visits that occurred early in the campaign.

Because there is only a single interparty match per reporting period, MTA Option 2 requires only a single set of user level MTA weights rather than the daily MTA weights required in MTA Option 1. The single inter party match on day T (the report date) is between $\tilde{U}_T^A$ and the cumulative to date exposure files $E_T^B$ and $E_T^C$. The exposure files $E_T^B$ and $E_T^C$ are defined exactly as they were under MTA Option 1, but the file $\tilde{U}_T^A$ now represents the set of all users (including both visitors and non-visitors) observed by Party A at any point during the measurement period (days t=1, 2, 3, . . . , T). In addition, the homomorphically encrypted visits attached to each user in the file, now represents each user's total visits to brand locations CTD through days t=1, 2, 3, . . . , T. While the daily visits attached to users under MTA Option 1 were capped at 1 visit per user per location per day, the CTD visits can take any non-negative integer value $Z_+$. A user can only visit at most once per day, but can have multiple visits across multiple days.

The definition and calculation of the user level MTA weights remains unchanged from the first method example. The calculation of fractionally attributed exposed users by publisher is also unchanged and remains:

$$N_T^{eX} = \sum_{i=1}^{N_T^e} \alpha_i^X \quad X \in \{B, C\}$$

What differs under MTA Option 2 is the calculation of fractionally attributed visits. With MTA Option 2 the calculation of fractionally attributed visits is:

$$\tilde{V}_T^{eX} = \sum_{i=1}^{N_T^e} \tilde{v}_t^i \times \alpha_i^X$$

Whereas in the first method example, we had $v_t^i \in \{0, 1\} \forall t, i$ because a user's daily visits must be either 0 or 1, in this second method example, we have $\tilde{v}_T^i \in Z_+$ because a user's CTD visits can take any non-negative integer value (strictly speaking, a user's CTD visits through day T cannot exceed T, but this is almost never a binding constraint.

Because there is only the single interparty match at day T under MTA Option2, there is no need to aggregate visits across days so that $N^{eX}(T)=N_T^{eX}$ and $\tilde{V}^{eX}(T)=\tilde{V}_T^{eX}$. The calculation of visit rates under MTA Option 2 is then simply:

$$EVR^B(T) = \frac{\tilde{V}^{eB}(T)}{N^{eB}(T)} \quad EVR^C(T) = \frac{\tilde{V}^{eC}(T)}{N^{eC}(T)}$$

Once again, these exposed visit rates by publisher can then be combined with a common unexposed visit rate, calculated separately without the need of MTA since the unexposed/control population does not receive any ad exposures, to produce a lift analysis of ad effectiveness by publisher. The definition of the MTA weights $\alpha_i^{B|C}$ and some simple algebra implies:

$$N^e(T)=N^{eB}(T)+N^{eC}(T)$$

$$\tilde{V}^e(T)=\tilde{V}^{eB}(T)+\tilde{V}^{eC}(T)$$

These relationships between overall users and visits to the publisher specific values for users and visits assures sensible alignment of results between overall and publisher.

A third exemplary MTA computation method uses matching for each of multiple time segments for some actor data (e.g., data for actors associated with events/visitors) and less frequent matching for other actor data (e.g., data for actors not associated with events/non-visitors). Doing so provides the accuracy of method 1 while conserving computational resources. This method matches multi-source data for each of multiple time segments (e.g., daily) to calculate (a) the number of contacted actors associated with events (e.g., exposed visitors/excluding non-visitors) during each of the time segments (e.g., daily) that are attributable to each of the sources (e.g., publishers) and (b) the number of contacted events (e.g., exposed visits) during each of the time segments (e.g., daily) attributable to each of the sources (e.g., publishers). These time segment-specific values are aggregated for an entire time period (e.g., monthly). Actors not associated with events (e.g., non-visitors) are treated separately and evaluated using a single cumulative-to-date, inter-source match of all actors not associated with events (e.g., all non-visiting users observed by Party A at any time during the period). Because actors not associated with events (e.g., non-visitors) have zero actions (e.g., visits) by definition, only the fractional attribution of the actors not associated with events (e.g., non-visiting users) need be described for each source (e.g., publisher). This single cumulative-to-date value for the number of contacted actors not associated with events (e.g. exposed non-visitors) can be combined with the aggregated value for actors associated with events (e.g., visitors). Thus, the number of contacted actors (exposed users) equals the sum of contacted actors associated with events (e.g., exposed visitors) plus contacted actors not associated with events (e.g., exposed non-visitors) for each of the publishers. The contacted event and combined contacted actor values may then be used to provide a contacted event rate for each source. As with method 1, the contacted event rate equals the events attributed to the source divided by the combined actors attributed to the source (e.g., an exposed visit rate for a publisher equals the visits attributed to the publisher divided by the users exposed by the publisher). The contacted event rate for each source (e.g., exposed visit rate by publisher) can then be combined with a common uncontacted event rate (e.g., unexposed visit rate) to produce an analysis per source (e.g., a lift analysis of impression effectiveness per publisher).

In some implementations, an MTA computation is a hybrid combination of the two methods described above. This method provides per-visit attribution based on post-exposure visits, but with more manageable compute than the first method. The reduced computational burden is accomplished by combining a daily inter-party match of visitors with CTD exposures as described in the first method (but limited to visitors only; excluding non-visitors) with a single CTD inter-Party match of non-visitors as described in second method (but limited to non-visitors only; excluding visitors).

The definition and calculation of MTA weights remains unchanged. For the daily inter-Party match of visitors we have:

$$N_t^{evX} = \sum_{i=1}^{N_t^{ev}} \alpha_i^X$$

where $N_t^{ev}$ is the number of exposed visitors (non-visitors are excluded) on day t as indicated by the daily inter-Party match process. Similarly, daily visits are calculated as:

$$V_t^{evX} = \sum_{i=1}^{N_t^{ev}} v_t^i \times \alpha_i^X$$

Because the above calculations are limited to visitors only, $v_t^i=1$ $\forall t,i$ which implies $V_t^{evX}=N_t^{evX}$ $\forall t=1, 2, 3, m \ldots, T$. The results from the daily inter-party visitor match are aggregated across days as before for each publisher $X \in \{B, C\}$ $$N^{evX}(T) = \sum_{t=1}^{T} N_t^{evX} \quad V^{evX}(T) = \sum_{t=1}^{T} V_t^{evX}$$

Non-visitors are treated separately under MTA Option 3, with a single CTD inter-party match between all non-visiting users observed by Party A at any time during the reporting period (t=1, 2, 3, . . . , T). Because non-visitors have zero visits by definition, we need only describe the fractional attribution of the non-visiting users. Using only a single CTD match of non-visitors at the end of the reporting period T, we have for each publisher $X \in \{B, C\}$:

$$N^{enX}(T) = N_T^{enX} = \sum_{i=1}^{N_T^{en}} \alpha_i^X$$

This single CTD value for the number of exposed non-visitors can be combined with the aggregated value for visitors producing:

$$N^{eB}(T) = N^{evB}(T) + N^{enB}(T)$$

$$N^{eC}(T) = N^{evC}(T) + N^{enC}(T)$$

Which states that the number of exposed users equals the sum of exposed visitors plus exposed non-visitors for each of the publishers, Parties B and C. The calculation of visit rates under MTA Option 4 is then simply:

$$EVR^B(T) = \frac{V^{eB}(T)}{N^{eB}(T)} \quad EVR^C(T) = \frac{V^{eC}(T)}{N^{eC}(T)}$$

Once again, these exposed visit rates by publisher can then be combined with a common unexposed visit rate, calculated separately without the need of MTA since the unexposed/control population does not receive any ad exposures, to produce a lift analysis of ad effectiveness by publisher. The definition of the MTA weights $\alpha_i^{B|C}$ and some simple algebra implies $$N^e(T) = N^{eB}(T) + N^{eC}(T)$$

$$V^e(T) = V^{eB}(T) + V^{eC}(T)$$

These relationships between overall users and visits to the publisher specific values for users and visits assures sensible alignment of results between overall and publisher.

Control Group Generation Example

Techniques herein may be used to generate a control group. For example, some implementations create a control group that includes only identifiers that do not match identifiers from other sources (e.g., selecting the subset of identifiers in a control group candidate set that were not exposed to contacts/advertisements by any of one or more secondary providers), while maintaining the privacy of the identifiers maintained by the various sources. This use of a unique, homomorphic attribute in such control group creation may facilitate maintaining data privacy.

Figure 8:
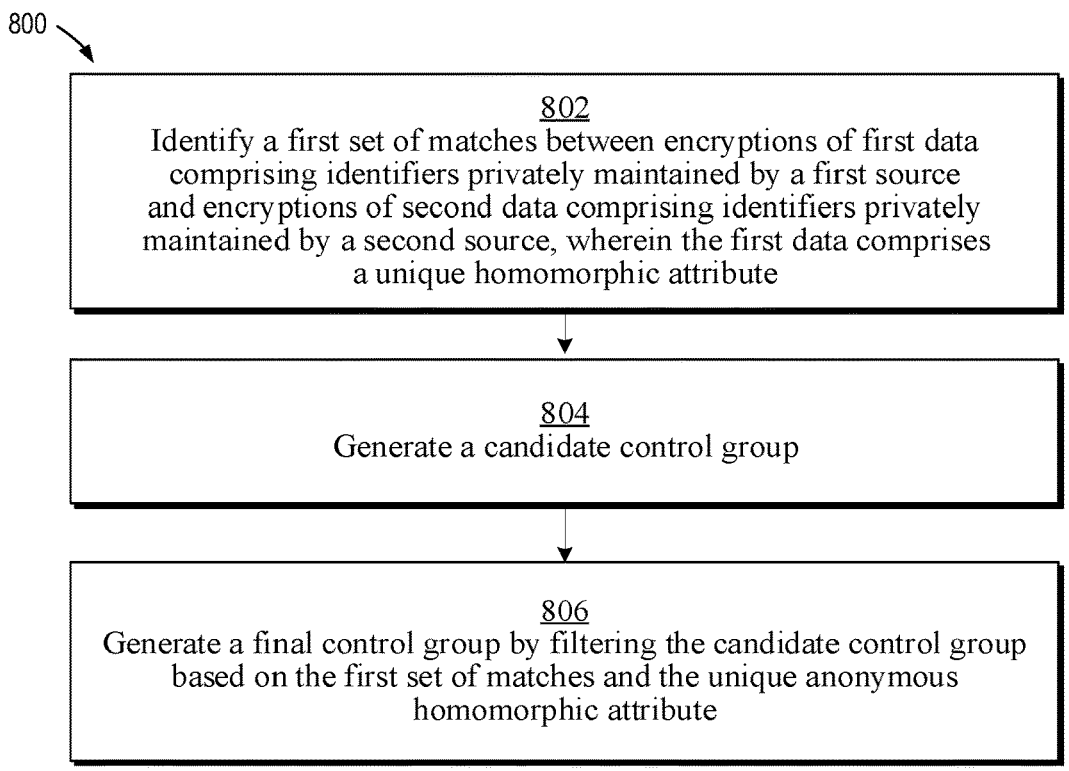
FIG. 8 is a flow chart illustrating an exemplary method for creating a control group based on the use of a unique, homomorphic attribute according to some implementations disclosed herein.

FIG. 8 is a flow chart illustrating an exemplary method 800 for creating a control group based on the use of a unique, homomorphic attribute. The exemplary method 800 can be implemented via a computing device, for example, using a processor to execute instructions stored in a non-transitory computer-readable medium. Reference to the method 800 being performed by a computing device includes the method 800 being performed by one or more computing devices and/or using one or more processors.

At block 802, the method 800 identifies a first set of matches between encryptions of first data comprising identifiers privately maintained by a first source and encryptions of second data comprising identifiers privately maintained by a second source, where the first data comprises a unique homomorphic attribute. The identification of the first set of matches may be based on comparing (a) identifiers maintained by the first source after encryption by the first source and then re-encryption by the second source with identifiers (b) maintained by the second source after encryption by the second source and then re-encryption by the first source.

At block 804, the method 800 generates a candidate control group. The candidate control group may be generated using a forensic control algorithm. The candidate control group may be generated using a control group seed (CGS), e.g., in a machine learning-based expansion model. Such a control group seed may include a set of identifiers that excludes the identifiers privately maintained by the second source (and any other sources being considered). In some implementations, a control group seed is composed of the difference in the data of the second source minus any visitors from the first source. In some implementations, the candidate control group is generated using a control group seed of the identifiers privately maintained by the first source, e.g., all of the identifiers of the first source may be used as the control group seed.

At block 806, the method 800 generates a final control group by filtering the candidate control group based on the first set of matches and the unique anonymous homomorphic attribute. The filtering may involve filtering an expanded set to exclude identifiers privately maintained by the second source (and any other sources being considered). The filtering may filter out any of the candidates that were generated as part of a machine-learning model-based expansion that end up also being in data of the second (and other) source.

A control group may be generated in various circumstances. In one example, a control group is provided in the circumstance in which a second source is a publisher who cannot provide a control group. In another example, the sources include multiple publishers on an advertising campaign where cross publisher private matching to filter the control is not possible and a control group can be created based on primary visits provider, i.e., the first source.

In such example use cases, there are different ways to create a control group, e.g., (a) from the set of known non-exposed visitors or (b) from the set of all visitors. For these techniques, a number of factors should be met for the control candidate identifiers in order to be included in the final control group for visit lift calculations in a private EMS environment. A Control Group Seed (CGS) should be created from the set of visitor IDs. Control IDs by definition have not been exposed to advertising. There is no concept of "post exposure" for control IDs since they have not been exposed to advertising. EMS must be able to identify that the candidate control ID was NOT exposed to advertising by any of the secondary providers (the publishers).

One technique for generating a control group is based on the set of known non-exposed visitors. This method may require more fidelity with publishers since the control group seed is composed of the difference in the secondary publisher's exposed group minus any visitors from the primary visit dataset. In other words, this method identifies the clear text IDs that were NOT exposed from the set of visitors to generate the CGS. Using this method, the matching service filters out all the match-keys that visited and were exposed, leaving the visitors that were not exposed and visited.

Another technique for generating a control group is based on the set of all visitors. Since there is no pre-filtering of any visitors, all visitors are used as the CGS, for example, as inputs into the ML expansion ML model.

For either of these methods, additional homomorphic attributes, or secondary provider targeting tactics could be appended to the control candidates in the CGS prior to control expansion, e.g., based on the patterns seen in attribute data from the one or more sources. The CGS may be expanded (e.g., using ML models) to find additional IDs that are "look alikes" to the IDs in the CGS and by definition did not visit. The expanded candidate control group (ECCG) should be filtered by EMS to identify Round 1 IDs in the ECCG that were NOT exposed to produce the Final Control Group (FCG) and will have been encrypted in Round 1 and stored. The ECCG looks like the original CGS. The ECCG contains both non-exposed visitors and non-exposed non-visitors that are similar (e.g., look-alike) to the exposed group and mutually exclusive to the exposed group. The ECCG may have any other filters applied to it (gender, DMA, etc) that were used by the ML model to find candidate identifiers. The ECCG IDs are randomly chosen from the ECCG and added to the visitors group from Method 1 or Method 2 and by definition the ECCG IDs did not visit. The opportunity to visit is the same for the ECCG IDs as it is for the original CGS that was composed of purely visitors. The count of the number of IDs in the final control group is calculated, for example, to be the same size as the exposed group, to be a specified portion—$\frac{1}{10}$—of the exposed group size, or to be a multiple of the exposed group size.

The methods described above may differ with respect to the removal of exposed visitors prior to expansion in the first method. The first method may be less private, while the exposed visitors in the second method may be removed post expansion after Round 1 encryption, and thus, may be more private. Additional filters may need to be applied to the second method to remove bias introduced by exposed visitors being part of the seed.

The following provides an example scenario of how a control group could be generated by the primary provider (Party A) using the first method. In this example, Party A submits the control candidate visitor IDs as the match-key, Party B submits the exposed ID and optionally any other homomorphic filters, and Party C also submits the exposed ID and optionally any other homomorphic filters:

| Party A (primary) | Party B (secondary) | Party C (secondary) |
|---|---|---|
| ID1 | ID1 | ID3 |
| ID2 | ID3 | ID4 |
| ID5 | ID4 | ID6 |
| ID9 | ID7 | ID13 |
| ID11 | ID15 | ID8 |

Through ECC, Party A can determine that ID2, ID5, ID9, and ID11 were not exposed to advertising by either of the secondary providers. These identifiers, already previously known to Party A in clear-text as part of the original visit dataset, are now considered the CGS.

Additional filters and attributes could be applied to the CGS pre or post expansion. For example, Publishers B and C might be targeting by gender M/F (70/30) and/or Publishers might be targeting by DMA (501-NY Metro, 803-Los Angeles, 847-SF Bay). The Expanded Candidate Control Group (ECCG) is filtered in this scenario to a 70/30 M/F ratio where the IDs are identified as being in one of the three DMA metro areas.

EMS may be run on the ECCG to identify the IDs that were NOT exposed to advertising by any of the secondary providers, and thus the Final Control Group (FCG) is produced as a Round 1 file encrypted with the primary provider's private key so it may be used in future EMS operations.

Figure 9:
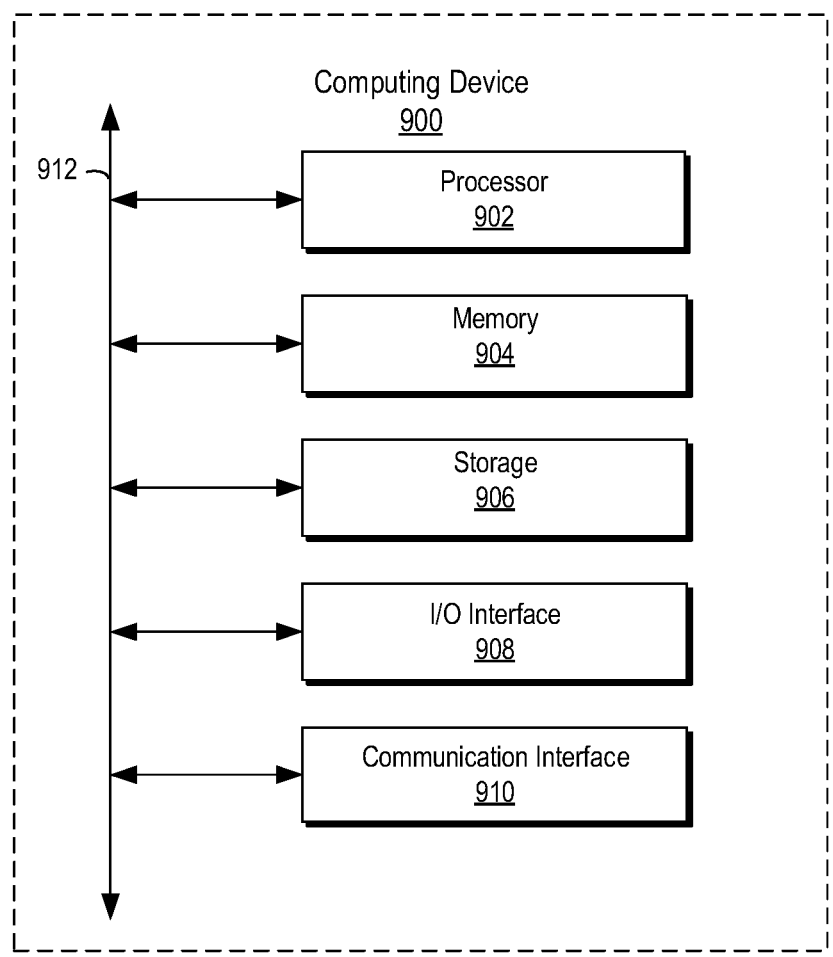
FIG. 9 is a block diagram depicting an example hardware implementation.

FIG. 9 is a block diagram depicting an example hardware implementation for the devices described in FIG. 1. Each such device 900 may include a processor 902 that is communicatively coupled to memory 904 and storage 906 and that executes computer-executable program code and/or access information stored in the memory 904 and storage 906. The processor 902 may comprise a microprocessor, an application-specific integrated circuit ("ASIC"), a state machine, or other processing device. The processor 902 can include any of a number of processing devices, including one. Such a processor 902 can include or may be in communication with a computer-readable medium storing instructions that, when executed by the processor, cause the processor to perform the operations described herein.

The memory 904 and storage 906 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 900 may also comprise a number of external or internal devices such as input or output devices. For example, the device 900 may have input/output ("I/O") interface 908 that can receive input from input devices or provide output to output devices. A bus 912 can also be included in the device 900. The bus 912 can communicatively couple one or more components.

The device 900 can also include at least one network interface device or other communication interface 910. The communication interface 900 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method comprising:
at a processor of a first device:
generating a first set of encrypted identifiers by encrypting identifiers privately maintained by a first source using a first private key encryption;
generating an altered first set of encrypted identifiers by randomizing an order of the identifiers of the first set of encrypted identifiers and associating a unique attribute with each of the encrypted identifiers of the randomized first set of encrypted identifiers; and
performing an encrypted commutative match service between the identifiers privately maintained by the first source and identifiers privately maintained by one or more additional sources, wherein the encrypted match service identifies matches based on the unique attribute associated with each of the encrypted identifiers of the altered first set of encrypted identifiers, wherein the unique attributes uniquely identify associated encrypted identifiers without requiring first private key decryption.

2. The method of claim 1, wherein associating the unique attribute with each of the encrypted identifiers of the randomized first set of encrypted identifiers comprises assigning an anonymous, homomorphic unique identifier to each of the encrypted identifiers of the randomized first set of encrypted identifiers.

3. The method of claim 1, wherein encryption and randomization provides identifier privacy while allowing N-way matching using the unique attribute associated with each of the encrypted identifiers of the altered first set of encrypted identifiers.

4. The method of claim 1 further comprising determining multi-touch attribution based on the encrypted match service, wherein an identifier privately maintained by the first source is matched with both an identifier privately maintained by a second source and an identifier privately maintained by a third source.

5. The method of claim 4, wherein:
the identifier of the second source is associated with a first number of actions;
the identifier of the third source is associated with a second number of actions; and
the multi-touch attribution attributes an event tracked by the identifier of the first source with both the first number of actions of the second source and the second number of actions of the third source.

6. The method of claim 1 further comprising:
generating a candidate control group; and
generating a final control group by filtering the candidate control group based on the matches, wherein the filtering excludes the identifiers privately maintained by any of the plurality of additional sources from the final control group.

7. The method of claim 6, wherein the candidate control group is generated using a forensic control algorithm.

8. The method of claim 6, wherein the candidate control group is generated using a control group seed, the control group seed comprising a set of identifiers that excludes the identifiers privately maintained by any of the plurality of additional sources.

9. The method of claim 6, wherein the candidate control group is generated using a control group seed in a forensic control algorithm, the control group seed comprising the identifiers originating from the original source.

10. The method of claim 1, wherein performing the encrypted match service comprises:
sending the altered first set of encrypted identifiers to a second source and a third source;
receiving a second set of encrypted identifiers originating from the second source and encrypted using a second private encryption key;
receiving a third set of encrypted identifiers originating from the third source and encrypted using a third private encryption key;
generating a first set of twice encrypted identifiers by encrypting the second set of encrypted identifiers originating from the second source with the first encryption key;
generating a second set of twice encrypted identifiers by encrypting the third set of encrypted identifiers originating from the third source with the first encryption key;
receiving a third set of twice encrypted identifiers comprising the first set of encrypted identifiers encrypted by the second source using the second encryption key;
receiving a fourth set of twice encrypted identifiers comprising the first set of encrypted identifiers encrypted by the third source using the third encryption key.

11. The method of claim 10, wherein the encrypted match service:
identifies a first set of matches between the first source and the second source using the first and third sets of twice encrypted identifiers;
identifies a second set of matches between the first source and the third source using the second and fourth sets of twice encrypted identifiers; and
identifies a third set of matches between the first source and both the second and third sources using the unique attributes in the altered first set of encrypted identifiers, the third set of twice encrypted identifiers, and the fourth set of twice encrypted identifiers.

12. The method of claim 1, wherein the encrypted match service exchanges only encrypted data between the first source and the additional sources.

13. A method comprising:
at a processor of a first device:
identifying a first set of matches between encryptions of first data comprising identifiers privately maintained by a first source and encryptions of second data comprising identifiers privately maintained by a second source, wherein the first data comprises a unique attribute;
identifying a second set of matches between encryptions of the first data comprising identifiers privately maintained by the first source and encryptions of third data comprising identifiers privately maintained by a third source; and
generating associations between the first set of encrypted matches and the second set of matches based on the unique attribute.

14. The method of claim 13, wherein:
identifying the first set of matches comprises comparing identifiers privately maintained by the first source after encryption and randomization by the first source and then encryption by the second source with identifiers privately maintained by the second source after encryption by the second source and then encryption by the first source; and
identifying the second set of matches comprises comparing identifiers privately maintained by the first source after encryption and randomization by the first source and then encryption by the third source with identifiers privately maintained by the third source after encryption by the third source and then encryption by the first source.

15. The method of claim 13, wherein generating the associations comprises:
generating an altered first set of encrypted randomized identifiers based on the first data and the unique homomorphic attribute; and
matching the altered first set of encrypted with the encryptions of first data of the first set of matches; and
matching the altered first set of encrypted identifiers with the encryptions of first data of the second set of matches.

16. The method of claim 13, wherein generating the associations comprises multi-touch attribution.

17. The method of claim 16, wherein the multi-touch attribution is based on homographic attribute values corresponding to events associated with the identifiers privately maintained by the second source and the identifiers privately maintained by the third source.

18. A method comprising:
at a processor of a first device:
identifying a first set of matches between encryptions of first data comprising identifiers privately maintained by a first source and encryptions of second data comprising identifiers privately maintained by a second source, wherein the first data comprises a unique attribute;
generating a candidate control group; and
generating a final control group by filtering the candidate control group based on the first set of matches and the unique attribute.

19. The method of claim 18 further comprising:
identifying a second set of matches between encryptions of the first data comprising identifiers privately maintained by the first source and encryptions of third data comprising identifiers privately maintained by a third source, wherein filtering the candidate control group is further based on the second set of matches.

20. The method of claim 19, wherein filtering the candidate control group comprises determining excluding identifiers from the control group that correspond to identifiers privately maintained by either or both of the second source and the third source.

21. The method of claim 18, wherein the candidate control group is generated using a forensic control algorithm.

22. The method of claim 18, wherein the candidate control group is generated using a control group seed, the control group seed comprising a set of identifiers that excludes the identifiers privately maintained by the second source and the identifiers privately maintained by the third source.

23. The method of claim 18, wherein the candidate control group is generated using a control group seed, the control group seed comprising the identifiers privately maintained by the first source.

24. The method of claim 18, wherein the candidate control group is generated by:

generating an expanded set of identifiers; and filtering the expanded set to exclude identifiers privately maintained by the second source and the identifiers privately maintained by the third source.

* * * * *